US007208211B2

(12) United States Patent
Tanaka et al.

(10) Patent No.: US 7,208,211 B2
(45) Date of Patent: Apr. 24, 2007

(54) ELECTROPHOTOGRAPHIC BELT MEMBER, PROCESS FOR PRODUCING ELECTROPHOTOGRAPHIC BELT MEMBER, AND ELECTROPHOTOGRAPHIC APPARATUS

(75) Inventors: Atsushi Tanaka, Shizuoka (JP); Akihiko Nakazawa, Shizuoka (JP); Tsunenori Ashibe, Kanagawa (JP); Takashi Kusaba, Shizuoka (JP); Hidekazu Matsuda, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/954,252

(22) Filed: Sep. 18, 2001

(65) Prior Publication Data

US 2002/0058189 A1 May 16, 2002

(30) Foreign Application Priority Data

Sep. 19, 2000 (JP) ............................ 2000-284095

(51) Int. Cl.

*B32B 1/08* (2006.01)
*B32B 27/08* (2006.01)
*G03G 15/16* (2006.01)
*G03G 15/01* (2006.01)
*G03G 13/00* (2006.01)

(52) U.S. Cl. ................ 428/36.9; 428/35.7; 428/36.92; 399/297; 399/302; 399/308; 430/31; 430/32; 430/126

(58) Field of Classification Search ................ 428/199, 428/220, 215, 213, 35.7, 36.9, 36.91, 126, 428/36.92; 430/47, 62, 126, 31, 32; 399/302, 399/308, 301, 297

See application file for complete search history.

(56) References Cited

U.S. PATENT DOCUMENTS

| | | | | |
|---|---|---|---|---|
| 5,802,442 | A * | 9/1998 | Konno et al. | 399/308 |
| 5,873,018 | A * | 2/1999 | Aoto et al. | 399/302 |
| 6,071,662 | A * | 6/2000 | Carmichael et al. | 430/69 |
| 6,117,603 | A * | 9/2000 | Yu et al. | 430/66 |
| 6,303,072 | B1 * | 10/2001 | Kobayashi et al. | 264/564 |
| 6,600,893 | B2 * | 7/2003 | Ashibe et al. | 399/302 |

* cited by examiner

*Primary Examiner*—Rena Dye
*Assistant Examiner*—Lawrence Ferguson
(74) *Attorney, Agent, or Firm*—Fitzpatrick, Cella, Harper & Scinto

(57) ABSTRACT

In an electrophotographic belt member comprising a resin composition, the resin composition contains from 30% by weight to 90% by weight of a thermoplastic resin, from 2% by weight to 30% by weight of a compound selected from the group consisting of a polyether-ester amide, a polyether ester and a polyether amide, from 0% by weight to 5% by weight of an electrolyte, and from 2% by weight to 50% by weight of an insulating filler. Also disclosed are a process for producing the electrophotographic belt member, and an electrophotographic apparatus having the electrophotographic belt member.

13 Claims, 4 Drawing Sheets

ELECTROPHOTOGRAPHIC BELT MEMBER, PROCESS FOR PRODUCING ELECTROPHOTOGRAPHIC BELT MEMBER, AND ELECTROPHOTOGRAPHIC APPARATUS

BACKGROUND OF THE INVENTION

1. Field of the Invention

This invention relates to an electrophotographic belt member, a process for producing the electrophotographic belt member, and an electrophotographic apparatus, and more particularly to an electrophotographic belt member having a specific resin composition, a process for producing the electrophotographic belt member, and an electrophotographic apparatus having the electrophotographic belt member.

2. Related Background Art

With progress of full-color image formation by electrophotographic apparatus in recent years, there is a more and more increasing demand for electrophotographic belt members having electrical conductivity, such as an intermediate transfer belt (a belt used when, before toner images formed on an electrophotographic photosensitive member are transferred to a transfer medium such as paper, the toner images are once transferred onto an intermediate transfer belt and thereafter the toner images held on the intermediate transfer belt are transferred to the transfer medium to obtain images), a transfer-transport belt (a belt used when toner images formed on image-bearing members are transferred to a transfer medium such as paper and the transfer medium is transported), a photosensitive belt and a fixing belt; in particular, for the intermediate transfer belt and the transfer-transport belt.

Then, the electrophotographic belt member is required to have the following properties.

1) To have a good resistance to creep;
2) to have a good resistance to flexing;
3) to have a good uniformity in electrical resistance;
4) to have a high breakdown strength;
5) to less cause a change in belt peripheral length due to service environment;
6) to have a low cost; and so forth.

Conducting agents used to endow the electrophotographic belt member with electrical conductivity can roughly be grouped into two types, a conductive filler and an ion-conducting agent.

At present, in most electrophotographic belt members having been put into practical use, carbon black is used as a conducting agent. For example, belts disclosed in Japanese Patent Application Laid-open No. 5-200904 and Japanese Patent No. 2886505 also contain carbon black (conductive filler).

When, however, such a conductive filler is compounded, problems tend to occur such that an unstable state of dispersion (i.e., production scattering) of conductive fillers causes variations in electrical resistance and that any faulty dispersion (i.e., agglomeration) of conductive fillers causes an extreme lowering of breakdown strength.

On the other hand, when the ion-conducting agent is used, since a dispersion of the ion-conducting agent is remarkably good, there may occur no problem such as the production scattering of electrical resistance and the lowering of breakdown strength. However, since most ion-conducting agents may gradually ooze out (i.e., bleed out) to the film surface, there is a problem that the surface resistance changes or that the surface of the electrophotographic photosensitive member stress-cracks to cause faulty images.

To cope with such problems, Japanese Patent Application Laid-open No. 8-50419 and Japanese Patent Publication No. 8-7505 disclose belts containing polyether-ester amide, polyether ester or polyether amide as a chief conducting agent so that the belt may undergo any change in resistance due to bleeding and can have uniform resistance values.

Now, the present inventors produced as an experiment the belts disclosed in these publications to evaluation as electrophotographic belt members used in electrophotographic apparatus. As the result, the belts disclosed in these publications have proved to have problems that;

(1) the resistance to creep becomes poor to cause a change in belt peripheral length during repeated used, so that multi-color toner images can not superimposingly be transferred to the preset position (color aberration); and
(2) the belt peripheral length greatly changes depending on service environment, and hence the belt and a drive roller of the belt may slip in a high-temperature and high-humidity environment to worsen the color aberration, or the belt tension may increase so abnormally in a low-temperature and low-humidity environment that the belt drive torque may become higher, until the belt can no longer be driven.

The problem (1) is presumed to be due to the fact that the polyether-ester amide, polyether ester and polyether amide are all so soft as to cause a lowering of modulus in tension of a resin composition.

The problem (2) is also presumed to be due to the fact that the polyether-ester amide, polyether ester and polyether amide all have so high a coefficient of linear expansion and a water absorption as to cause a great change in belt peripheral length depending on service environment.

Accordingly, in order to solve such new problems, the present inventors have attempted to compound an insulating filler so as to prevent the resistance to creep from becoming poor and the belt peripheral length from changing depending on service environment.

As the result, the mere addition of an insulating filler alone has proved to cause problems that the belt obtained may have so high an electrical resistance as to cause faulty transfer and that the resistance to flexing of the belt may lower to make the belt have an extremely short lifetime.

Thus, any electrophotographic belt member that satisfies all the requirements stated above has not been devised, and it has been long-awaited to bring out such a belt.

SUMMARY OF THE INVENTION

An object of the present invention is to provide an electrophotographic belt member that satisfies all the requirements 1) to 6), a process for producing such an electrophotographic belt member, and an electrophotographic apparatus making use of the electrophotographic belt member.

That is, the present invention provides an electrophotographic belt member comprising a resin composition, wherein the resin composition contains:

from 30% by weight to 90% by weight of a thermoplastic resin;

from 2% by weight to 30% by weight of a compound selected from the group consisting of a polyether-ester amide, a polyether ester and a polyether amide:

from 0% by weight to 5% by weight of an electrolyte; and from 2% by weight to 50% by weight of an insulating filler.

The present invention also provides a process for producing an electrophotographic belt member; the process comprising melt-extruding the above resin composition through the leading end of a circular die by means of an extruder in the form of a tube and in such a way that the resin composition has a wall thickness smaller than the die gap of the circular die.

The present invention still also provides a process for producing an electrophotographic belt member; the process comprising extruding a melt of the above resin composition through the leading end of a circular die by means of an extruder in the form of a tube, and taking off the tube at a speed higher than extrusion speed.

The present invention further provides a process for producing an electrophotographic belt member; the process comprising extruding the above resin composition through the leading end of a circular die by means of an extruder in the form of a tube, where the tube is so formed as to have a diameter which is 50 to 400% with respect to the diameter of the circular die.

The present invention still further provides a process for producing an electrophotographic belt member; the process comprising extruding the above resin composition through the leading end of a circular die by means of an extruder in the form of a tube, where a gas having a pressure higher than atmospheric pressure is blown into the tube to form the tube continuously while inflating the tube.

The present invention still further provides an electrophotographic apparatus having the above electrophotographic belt member.

DESCRIPTION OF THE PREFERRED EMBODIMENTS

Figure 1:
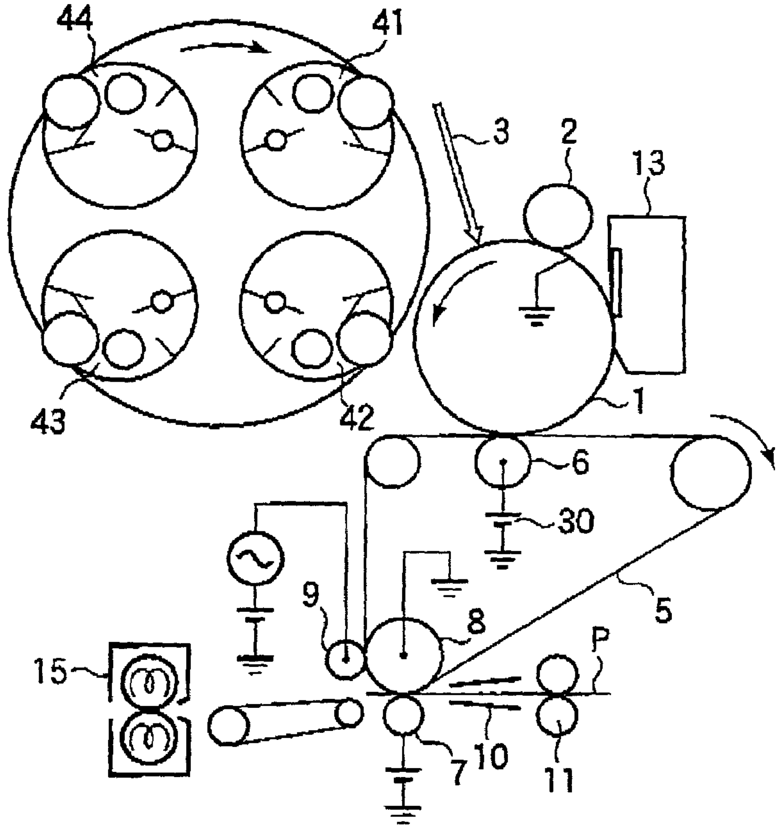
FIG. 1 illustrates an electrophotographic apparatus employing an intermediate transfer belt.

Embodiments of the present invention are described below in detail.

The present inventors have discovered that the problems discussed previously can be solved by using an electrophotographic belt member containing a resin composition having 30 to 90% by weight of a thermoplastic resin, 2 to 30% by weight of a compound selected from the group consisting of a polyether-ester amide, a polyether ester and a polyether amide, 0 to 5% by weight of an electrolyte, and 2 to 50% by weight of an insulating filler.

In the resin composition, the thermoplastic resin may more preferably be in a content of from 30 to 74% by weight based on the weight of the resin composition.

If the polyether-ester amide, polyether ester or polyether amide used as a conducting agent is less than 2% by weight, the electrophotographic belt member may have so high a resistance value that faulty transfer may occur. If the polyether-ester amide, polyether ester or polyether amide is more than 30% by weight, the modulus of elasticity and the resistance to creep can not avoid being poor even when reinforced with the insulating filler, because these are very soft, resulting in a great color aberration. Also, films may be sticky to cause a poor transfer efficiency.

If the electrolyte is more than 5% by weight, the electrolyte can not completely be held (or dissolved) in the interior of the resin composition, so that it may bleed out to the surface to make the belt surface sticky, resulting in a lowering of transfer efficiency. This may by no means occur as long as the electrolyte is 5% by weight or less, and its addition is preferred because it has the function of lowering electrical resistance effectively. The electrolyte may more preferably be added in an amount of from 1 to 3% by weight.

If the insulating filler is less than 2% by weight, the effect of reinforcement attributable to the filler may be lost. If the insulating filler is more than 50% by weight, the resin composition may have so high a melt viscosity as to make fabrication difficult, and moreover the electrophotographic belt member obtained may have an extremely poor resistance to flexing, resulting in a short lifetime of the belt. The insulating filler may more preferably be added in an amount of from 5 to 20% by weight.

Addition of fillers to resins commonly tends to make resin compositions brittle. However, the resin composition of the present invention makes use of the polyether-ester amide, polyether ester or polyether amide, and the flexibility attributable to these compounds is considered to prevent the resin composition from being made brittle because of the addition of the filler.

More specifically, within the formulation of the resin composition in the present invention, the disadvantage (being very soft) of the polyether-ester amide, polyether ester or polyether amide effectively keeps the resin composition from causing difficulties (being made brittle) because of the addition of the filler. Thus, the formulation preferable for use as the electrophotographic belt member has been achieved.

This point stands for the unique quality of the resin composition of the present invention. For example, in a resin composition disclosed in Japanese Patent Application Laid-open No. 11-172064, i.e., a resin composition comprised of a fluorine resin, an inorganic filler and a perfluoroalkylsulfonate, the effect of reinforcement attributable to the filler may be obtained, but the difficulties ascribable to the filler, i.e., the problem of brittleness which causes a lowering of belt durability can not be eliminated.

There is another effect attributable to the addition of the filler. Addition of the polyether-ester amide, polyether ester or polyether amide in a large quantity tends to make the resultant composition sticky, but the addition of the filler makes it not sticky. Hence, when the electrophotographic belt member obtained is used as the intermediate transfer belt, its transfer efficiency does not lower. Also, when the electrophotographic belt member is used as the transfer-transport belt, the belt may less become contaminated (accumulation of toner) as a result of running.

In the present invention, the thermoplastic resin is meant to be at least one resin selected from any known thermoplastic resins. Taking account of the resistance to heat of the polyether-ester amide, polyether ester or polyether amide, the thermoplastic resin serving as a base may preferably be a resin that can be worked at about 280° C. or below. Stated specifically, polyvinylidene fluoride, vinylidene fluoride copolymers, polyesters (e.g., polyethylene terephthalate and polybutylene terephthalate), polycarbonates, acrylic copolymers, polyolefins (e.g., polyethylene and polypropylene) and ABS resins are preferred.

Of these, polyvinylidene fluoride and vinylidene fluoride copolymers are preferred from the viewpoint of their workability at a low temperature of from 200 to 250° C. and superior flame retardancy.

The vinylidene fluoride copolymers are meant to be polymers comprised of a vinylidene fluoride unit and a unit other than that. For example, they may include a vinylidene fluoride-hexafluoropropylene copolymer, a vinylidene fluoride-tetrafluoroethylene copolymer, a vinylidene fluoride-tetrafluoroethylene-hexafluoropropylene copolymer and a vinylidene fluoride-acrylate copolymer.

Of course, the polyvinylidene fluoride and any of the vinylidene fluoride copolymers may be used in combination.

The polyether-ester amide in the present invention is meant to be a compound composed chiefly of a copolymer consisting of a polyamide block unit such as nylon 6, nylon 66, nylon 11 or nylon 12 and a polyether-ester unit. For example, it may include copolymers derived from salts of lactams or aminocarboxylic acids, polyethylene glycol and dicarboxylic acids (e.g., terephthalic acid, isophthalic acid and adipic acid).

The polyether ester is also meant to be a compound composed chiefly of a copolymer consisting of a polyether unit and a polyether unit. For example, it may include copolymers derived from polyethylene glycol and dicarboxylic acids (e.g., terephthalic acid, isophthalic acid and adipic acid).

The polyether amide is also meant to be a compound composed chiefly of a copolymer consisting of a polyamide block unit such as nylon 6, nylon 66, nylon 11 or nylon 12 and a polyether unit. For example, it may include copolymers composed chiefly of polyethylene glycol diamine and a dicarboxylic acid, an aliphatic diamine or ϵ-caprolactam.

What is meant by "composed chiefly of" is that the copolymer is held by at least 50% in weight weight ratio.

The polyether-ester amide, polyether ester or polyether amide may be produced by a known polymerization process. Two or more types of the polyether-ester amide. polyether ester or polyether amide may also be used. In particular, a polyamide having a high affinity for the polyether-ester amide, polyether ester or polyether amide and also having electrical conductivity may be blended or reacted with the polyether-ester amide, polyether ester or polyether amide. This is preferable because a conducting agent having a higher tensile strength can be obtained.

In the present invention, the electrolyte is meant to be a salt capable of dissolving in 100 g of water by at least 0.1 g at 25° C. For example, it may include perchlorates, tetrafluoroborates, phosphates, perfluoroalkylsulfonates, sulfates, thiocyanates or halides of alkali metals or alkaline earth metals. Of course, examples are by no means limited to these. A plurality of salts may also be used.

In the present invention, the insulating filler is meant to be a filler which, when the volume resistivity (A) of the resin composition of the present invention is compared with the volume resistivity (B) of the resin composition of the present invention from which the insulating filler has been removed (not compounded) and even if the value of A has become smaller than the value of B (i.e., the volume resistance has lowered), may lower by a degree less than one figure ($B/A<10$). Incidentally, even when what is called an insulating filler having a high electrical resistance as the filler itself is compounded, the compounding of the filler may make the resin composition have a little low electrical resistance. This is presumed to be due to an influence of water content or the like adsorbed on the filler. In the present invention, for that reason the insulating filler is defined not by the resistance value of the filler itself but in the manner as described above. Namely, the filler is judged to be insulative or conductive by whether or not it contributes substantially to the lowering of electrical resistance of the resin composition. Measurement of the volume resistance will be described later.

The insulating filler may be either of an inorganic matter and an organic matter. The insulating filler may have any shape. The insulating filler may preferably have an average particle diameter of from 0.05 to 2 μm. In the present invention, the average particle diameter is determined in the following way.

The resin composition (belt) is cut, and observed with a scanning electron microscope (SEM) or a transmission electron microscope (TEM). In an arbitrary visual field, 10 particles are picked up, and the diameters of circumcircles of the particles picked up are determined. An average value of the diameters of circumcircles is regarded as the average particle diameter. Incidentally, the SEM is used when the filler has an average particle diameter of 0.1 μm or larger, and the TEM when it has an average particle diameter smaller than 0.1 μm.

In order to make the insulating filler have a higher affinity for the resin or to keep the resin from undergoing decomposition, an insulating filler whose particle surfaces have been subjected to any desired treatment may also be used. As examples of such surface treatment, it may include treatment with a titanate-type coupling agent, a silane coupling agent or an esterifying agent.

The insulating filler may include, e.g. zinc oxide, barium sulfate, calcium sulfate, barium titanate, potassium titanate, titanium oxide, magnesium oxide, magnesium hydroxide, aluminum hydroxide, talc, mica, clay, kaolin, hydrotalcite, silica, alumina, ferrite, calcium carbonate, barium carbonate, nickel carbonate, glass powder, quartz powder, carbon fiber, glass fiber, alumina fiber, potassium titanate fiber, and fine particles of theraioplastic resins (e.g., fine phenol resin particles). Of course, examples are by no means limited to these substances. Two or more types of insulating fillers may also be used in combination.

In the resin composition of the present invention, other components may be added as long as the object of the present invention is not damaged. Stated specifically, such additives may be exemplified by an antioxidant (e.g., a hindered phenol type, a phosphorus type or a sulfur type), an ultraviolet light absorber, an organic pigment, an inorganic pigment, a pH adjuster, a cross-linking agent, a compatibilizer, a release agent (e.g., a silicone type or a fluorine type), a coupling agent, a lubricant and a conductive filler (e.g., carbon black, conductive titanium oxide, conductive tin oxide or conductive mica). Two or more types of these may also be used in combination.

By the way, Japanese Patent Application Laid-open No. 7-113029 discloses a resin composition comprised of a vinylidene fluoride resin and/or a fluorine rubber, a conductive filler and a thermoplastic polyether. This publication discloses that any inorganic filler may be added, but does not disclose at all any specific compositional ratio as in the present invention. It nothing but states general consideration that, in the case when a conductive filler is added, an inorganic filler other than that may also be added. Thus, this publication does not suggest any proportion of the resin composition of the present invention.

Where a conductive filler is added to the resin composition of the present invention, it may be added as long as its addition does not cause any change in electrical resistance of the resin composition. Stated specifically, it may be added as long as the volume resistance (C) in the case when the conductive filler is compounded and the volume resistance (D) in the case when it is not compounded are in a proportion of not more than 20 ($D/C \leqq 20$). If the conductive filler is added in a proportion of $D/C>20$, the electrophotographic belt member may have a low breakdown strength.

The electrophotographic belt member of the present invention may be produced by a process for producing an electrophotographic belt member; the process comprising melt-extruding the above resin composition from the leading end of a circular die by means of an extruder in the form of a tube and in such a way that the resin composition has a wall thickness smaller than the die gap of the circular die. This enables an improvement in wall thickness precision of the electrophotographic belt member. The reason therefor is considered as follows.

The electrophotographic belt member has a wall thickness of as small as about 50 to 300 μm. Accordingly, where the electrophotographic belt member has a wall thickness set equal to the value of the die gap, any unevenness of, e.g., 10 μm in the die gap necessarily appears as an unevenness of 10 μm also in the wall thickness of the electrophotographic belt member.

On the other hand, in the case of "die gap>electrophotographic belt member wall thickness", e.g., in the case when the die gap is 1 mm and the wall thickness of the electrophotographic belt member is 150 μm, even any unevenness of 10 μm in the die gap appears as an unevenness of only 1.5 μm also in the wall thickness of the electrophotographic belt member. Thus it is considered that, in the case of "die gap>electrophotographic belt member wall thickness", the electrophotographic belt member is improved in wall thickness precision.

Incidentally, the wall thickness precision herein referred to is concerned with both an aberration of average wall thickness with respect to an intended value and a wall thickness unevenness of the electrophotographic belt member.

If the electrophotographic belt member has a low wall thickness precision, a stress may concentrate at the part having a small belt thickness during the drive of the belt to cause cracks, or color aberration tends to occur because of uneven surface speed of the belt. The process of the present invention, however, by no means causes such troubles.

The electrophotographic belt member of the present invention may also be produced by a process for producing an electrophotographic belt member; the process comprising extruding a melt of the above resin composition through the leading end of a circular die by means of an extruder in the form of a tube, and taking off the tube at a speed higher than extrusion speed. This enables achievement of an improvement in wall thickness precision of the electrophotographic belt member and at the same time an improvement in Young's modulus (or modulus in tension) in the direction of thrust (i.e., the direction of extrusion). The reason therefor is considered as follows.

The improvement in wall thickness precision is explained first. When a molten resin is extruded from the circular die, it so behaves as to become large in wall thickness than the die gap (i.e., die swell) by the Barus effect. Hence, any gap unevenness of the die gap is amplified to become reflected on unevenness of wall thickness of the electrophotographic belt member. However, setting "ejection speed<take-off speed", the tube (i.e., electrophotographic belt member) is stretched out to become thin, and hence the aberration of wall thickness or unevenness of wall thickness can be made small.

The Young's modulus is explained next. Setting "ejection speed<take-off speed", the tube is brought into a state in which it has been monoaxially stretched in the direction of extrusion. This brings about an improvement in Young's modulus in the direction of thrust to preferably make color aberration less occur in the direction of thrust.

The electrophotographic belt member of the present invention may also be produced by a process for producing an electrophotographic belt member; the process comprising extruding the above resin composition through the leading end of a circular die by means of an extruder in the form of a tube, where the tube is so formed as to have a diameter (D2) which is 50 to 400% with respect to the diameter (D1) of the circular die, in particular, D2/D1 of 1 to 4. This can make the wall thickness of the electrophotographic belt member smaller than the die gap, to bring about an improvement in wall thickness precision of the electrophotographic belt member. It also follows that the tube is stretched in the peripheral direction. Hence, the Young's modulus in the peripheral direction is improved, so that the color aberration in the peripheral direction can be made to less occur.

Where the resin composition has a low melt viscosity, holes may be made in the tube to make it impossible to set the value of D2/D1 to be 1 or more in some cases. In such cases, too, the value of D2/D1 may be made as large as possible, stated specifically, to be 0.5 or more, whereby the wall thickness unevenness of the electrophotographic belt member can be kept minimum.

The value of D2/D1 may preferably be in the range of from 0.8 to 3.5, and more preferably in the range of from 0.9 to 2.5.

As an example of a production process by which the value of D2/D1 is achieved, a process may be used which comprises extruding the above resin composition through the leading end of a circular die by means of an extruder in the form of a tube, where a gas having a pressure higher than atmospheric pressure is blown into the tube to form the tube continuously while inflating the tube. This is a production process known as what is called inflation (also called blown-film extrusion or tubular film extrusion).

In particular, the tube may be taken off using a holding member having a width at least ½ of the peripheral length of the tube, with which the tube is held in its total width while being compressed in the cross direction. This is preferable because the flat width (or spread width) of the blown film, i.e., the peripheral length of the belt can be made stable. Also, the blown-film extrusion is a type of extrusion methods of taking off tubular melts continuously. Hence, the electrophotographic belt member can continuously be produced to enable production of the electrophotographic belt member at a low cost.

In addition, as the extruder for extruding the tubular melt, a twin-screw extruder may be used, whereby the polyetherester amide, polyether ester or polyether amide and the insulating filler can well be dispersed and mixed to enable power saving in the step of dispersion. Its use is also preferable because variations in electrical resistance due to any uneven dispersion can be made small and any faulty transfer due to the interference of power sources between transfer stations (primary transfer and secondary transfer) and any uneven transfer due to concentration of electrical currents at a low-resistance portion may hardly occur.

The resin composition of the present invention originally has a small unevenness in electrical resistance and hence may hardly cause troubles ascribable to variations in dispersion. However, its use in combination with the twin-screw extruder enables the resin composition of the present invention to exhibit its characteristic features to the maximum.

After the tubular melt having been extruded from the circular die has hardened, the tube may cut in substantially its cross direction to produce electrophotographic belt members. Where it is not cut in the cross direction, the electrophotographic belt member must finally be made to have a constant width, and hence it must again be cut in a post step so as to be cut in the cross direction. This makes the loss of materials greater and the number of steps larger, resulting in a low production efficiency.

Here, "cut the tube in the cross direction" is meant to cut the tube in a direction within ±30° with respect to a line parallel to the cross direction. The tube may preferably be cut in a direction within ±20° with respect to a line parallel to the cross direction, and more preferably in a direction within ±10° with respect to a line parallel to the cross direction.

Incidentally, in the present invention, the tubular melt is meant to be the resin having been extruded from the circular die in a circular form and standing molten. The product obtained after the tubular melt has been cooled to solidity is called the tube.

In the case when the tubular melt having been extruded from the circular die is taken off using the holding member (pinch rolls) while being held therewith in its total width, folds caused by the pinch rolls may remain in the electrophotographic belt member. To cope with this problem, the present inventors made studies. As the result, they have discovered that the tube obtained by the process of the present invention may be inserted to a gap between an inner mold and an outer mold which are made of materials having different coefficients of thermal expansion and the tube may be heated and cooled together with the molds, whereby the folds can be removed.

In the case when such secondary working is carried out, the inner mold and outer mold are repeatedly used, and the molds may undergo thermal shock. The higher the heating temperature is, the more greatly the lifetime of the molds is shortened as a result of repeated thermal shock. However, the thermoplastic resin composition of the present invention has a characteristic feature that the folds can be removed at a heating temperature of as low as 150 to 250° C., and hence it may less shorten the lifetime of the molds. The reason why the folds can be removed at a low temperature is considered to be attributable to a low melting point of the polyetherester amide, polyether ester or polyether amide used as the conducting agent.

Now, the electrophotographic belt member of the present invention may preferably have a volume resistance of from $10^0$ Ω to $10^{14}$ Ω, in particular, more preferably from $10^6$ Ω to $10^{12}$ Ω when the electrophotographic belt member is used as the intermediate transfer belt or transfer-transport belt, and from $10^0$Ω to $10^6$ Ω when used as the photosensitive belt.

The electrophotographic belt member of the present invention may also preferably have a surface resistance of from $10^0$ Ω to $10^{14}$ Ω.

The use of the resin composition of the present invention can control the maximum value of volume resistance in the peripheral direction of the electrophotographic belt member to be within 100 times the minimum value thereof. Hence, when the electrophotographic belt member is used as the intermediate transfer belt or transfer-transport belt, any uneven transfer in the peripheral direction, any interference of power sources between stations, and, when used as the transfer-transport belt, any interference between primary transfer bias power sources may hardly occur.

The use of the resin composition of the present invention can also control the maximum value of surface resistance in the peripheral direction of the electrophotographic belt member to be within 100 times the minimum value thereof. Hence, when the electrophotographic belt member is used as the intermediate transfer belt or transfer-transport belt, any uneven transfer in the peripheral direction, any interference of power sources between stations, and, when used as the transfer-transport belt, any interference between primary transfer bias power sources can be made to hardly occur.

The use of the resin composition of the present invention can also control the maximum value of volume resistance in the generatrix direction of the electrophotographic belt member to be within 100 times the minimum value thereof. Hence, when the electrophotographic belt member is used as the intermediate transfer belt or transfer-transport belt, any uneven transfer in the generatrix direction, any insulation breakdown of the electrophotographic belt member which may be caused by excessive electric current flowing into portions having minimum resistance, and any faulty operation of electrophotographic apparatus can be made to hardly occur.

The use of the resin composition of the present invention can also control the maximum value of surface resistance in the generatrix direction of the electrophotographic belt member to be within 100 times the minimum value thereof. Hence, when the electrophotographic belt member is used as the intermediate transfer belt or transfer-transport belt, any uneven transfer in the generatrix direction and any faulty cleaning can be made to hardly occur; the faulty cleaning being caused when the transfer residual toner remaining on the belt is charged by a charging means to effect cleaning (electrostatic cleaning) and when the bias electric current applied from the charging means flows concentratedly at low-resistance portions of the belt to make it impossible to uniformly charge the transfer residual toner remaining on the belt.

In the present invention, the volume resistance and the surface resistance are measured in the following way.

-Measuring Instrument-

Resistance meter; Ultra-high resistance meter R8340A (manufactured by Advantest Co.)

Sample box: Sample box TR42 for ultra-high resistance measurement (manufactured by Advantest Co.)

Here, the main electrode is 22 mm in diameter, and the guard-ring electrode is set to be 41 mm in inner diameter and 49 mm in outer diameter.

-Sample-

An electrophotographic belt member (wall thickness: about 50 to 300 μm) is out in a circular form of 56 mm in diameter. After cutting, it is provided, on its one side, with an electrode over the whole surface by forming a Pt—Pd deposited film and, on the other side, provided with a main electrode of 25 mm in diameter and a guard ring electrode of 38 mm in inner diameter and 50 mm in outer diameter by forming Pt—Pd deposited films. The main electrode and the guard ring electrode are provided on the concentric circle.

The Pt—Pd deposited films are formed by carrying out vacuum deposition for 2 minutes using Mild Sputter E1030 (manufactured by Hitachi Ltd.). The one on which the vacuum deposition has been carried out is used as the sample.

-Measurement Conditions-

Measurement atmosphere: 23±2° C., 55±5% RH. The measuring sample is previously kept left in the measurement atmosphere for 12 hours or longer.

Measurement mode: Program mode 5 (charge and measurement for 30 seconds, discharge for 10 seconds) Applied voltage: 1 to 1,000 V The applied voltage may arbitrarily be selected within the range of from 1 to 1,000 V which is part of the range of the voltage applied to the electrophotographic belt member used in the electrophotographic apparatus of the present invention. Also, the applied voltage at the time of measurement may appropriately be changed within the above range of applied voltage in accordance with the resistance value, thickness and breakdown strength of the sample. Also, as long as the volume resistance and surface resistance at a plurality of spots, measured at any one-point voltage of the above applied voltage, is included in the resistance range defined in the present invention, the resistance is judged to be within the resistance range intended in the present invention.

The electrophotographic belt member of the present invention may be of single-layer construction, or may be double- or more-layer construction. In the case when a multi-layer electrophotographic belt member is obtained, it may be obtained by extrusion from a multi-layer die, or by extruding a single-layer tube and thereafter forming an additional layer on the surface or back of the tube (e.g., by lamination, spray coating or dipping).

The electrophotographic belt member of the present invention may preferably have a wall thickness of from 50 to 300 μm, and more preferably from 60 to 200 μm. If it has a wall thickness smaller than 50 μm, the belt may have an insufficient mechanical strength (tensile strength) to tend to break during its use. If it has a wall thickness larger than 300 μm, the belt may have so high a rigidity that it may be difficult for the belt to be smoothly driven.

With regard to an electrophotographic apparatus employing the electrophotographic belt member of the present invention as the intermediate transfer belt, how it operates is outlined with reference to FIG. 1.

In FIG. 1, reference numeral 1 denotes an electrophotographic photosensitive member serving as a first image bearing member, which is rotatingly driven at a prescribed peripheral speed in the direction of an arrow. Then, the electrophotographic photosensitive member 1 is, in the course of its rotation, uniformly charged to prescribed polarity and potential by means of a primary charging assembly 2, and then imagewise exposed to light 3 by an exposure means (e.g., a laser beam emitter or LED). Thus, an electrostatic latent image is formed which corresponds to a first color component image (e.g., a yellow color component image) of the intended color image.

Next, the electrostatic latent image formed is developed by means of a first developing assembly (yellow color developing assembly 41).

The intermediate transfer belt 5 is rotatingly driven in the direction of an arrow at substantially the same peripheral speed as the electrophotographic photosensitive member 1 (e.g., about 97 to 103% with respect to the peripheral speed of the electrophotographic photosensitive member). The first-color yellow component image formed and held on the electrophotographic photosensitive member 1 passes a nip formed between the electrophotographic photosensitive member 1 and an intermediate transfer belt 5, in the course of which the yellow component image is transferred from the electrophotographic photosensitive member 1 to the periphery of the intermediate transfer belt 5 (primary transfer) by the aid of a primary transfer bias applied to the intermediate transfer belt 5 through a primary transfer roller 6. The primary transfer bias may be, e.g., about 100 to 3,000 V.

The electrophotographic photosensitive member 1, from which the toner image has been transferred to the intermediate transfer belt 5, is cleaned by a cleaning assembly 13 to remove the transfer residual toner, and is made ready for the steps of charging, exposure, development and transfer for the next color component.

Like the first-color component, second to fourth toner image are sequentially transferred superimposingly onto the intermediate transfer belt 5. Here, in the step of primary transfer of the first to third colors, a secondary transfer roller 7 and a belt cleaning member 9 are kept separate from the surface of the intermediate transfer belt 5. Reference numeral 8 denotes a transfer opposing roller.

After synthesized color toner images corresponding to the intended color image have been transferred to the intermediate transfer belt 5, the secondary transfer roller 7 is brought into contact with the intermediate transfer belt 5, and a transfer medium P is transported at a prescribed timing from a paper feed roller 11 to a contact zone between the intermediate transfer belt 5 and the secondary transfer roller 7, where the toner images are transferred to the second image bearing member transfer medium P (secondary transfer). Then, the transfer medium P to which the toner images have been transferred are guided into a fixing assembly 15 and the toner images are heat-fixed there. Reference numeral 10 denotes a paper feed guide.

After the toner images have been transferred to the transfer medium P, a belt cleaning member 9 is brought into contact with the intermediate transfer belt 5. Here, a roller is used as the belt cleaning member 9. To this roller, a voltage with a polarity reverse to that of the surface potential of the electrophotographic photosensitive member 1 is applied to charge the transfer residual toners to a polarity reverse to that of the electrophotographic photosensitive member 1. The transfer residual toners having been charged to a polarity reverse to that of the electrophotographic photosensitive member 1 are electrostatically transferred from the intermediate transfer belt 5 to the electrophotographic photosensitive member 1 at the nip between the electrophotographic photosensitive member 1 and the intermediate transfer belt 5 and the vicinity thereof. Thus, the intermediate transfer belt 5 is cleaned (electrostatic cleaning).

The electrophotographic apparatus employing the intermediate transfer belt of the present invention operates as outlined above. The electrophotographic belt member is of course applicable to apparatus other than the electrophotographic apparatus shown in FIG. 1.

Figure 2:
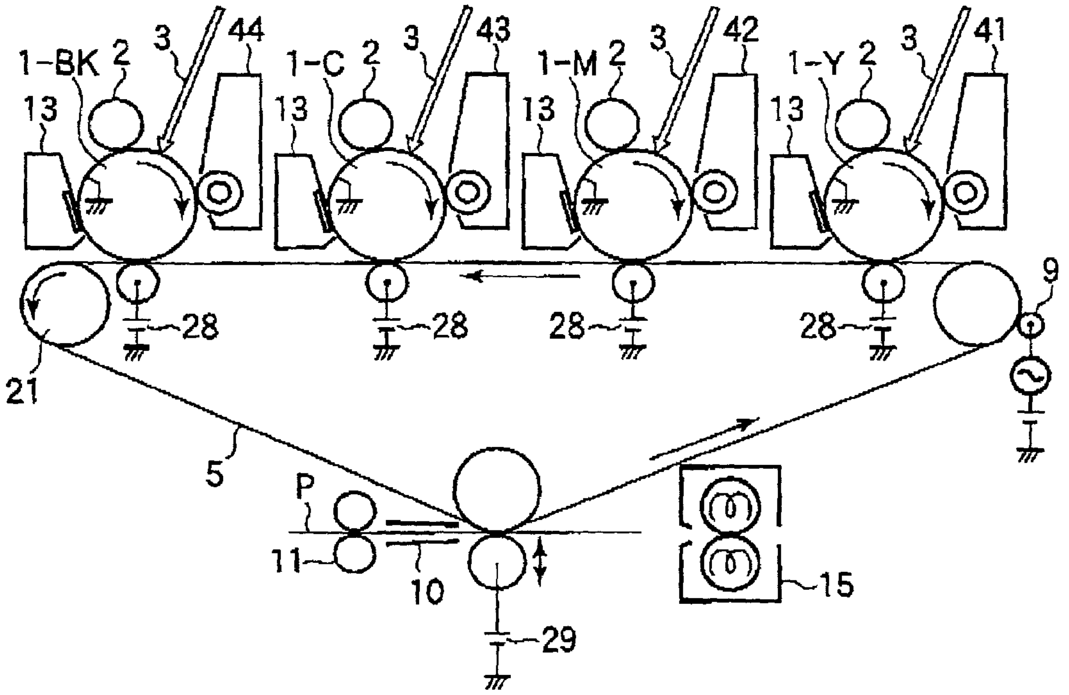
FIG. 2 illustrates an electrophotographic apparatus employing a plurality of electrophotographic photosensitive members and an intermediate transfer belt.
Figure 3:
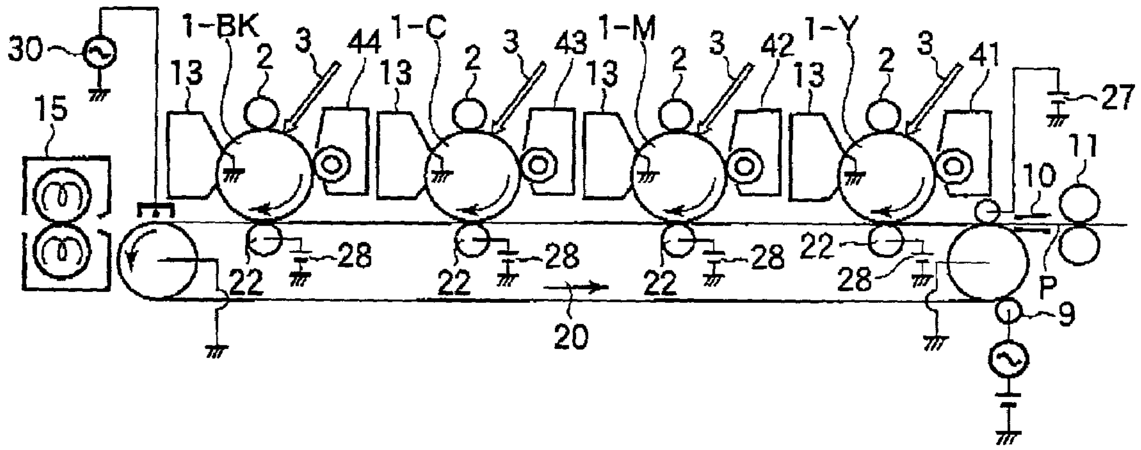
FIG. 3 illustrates an electrophotographic apparatus employing a transfer-transport belt.
Figure 4:
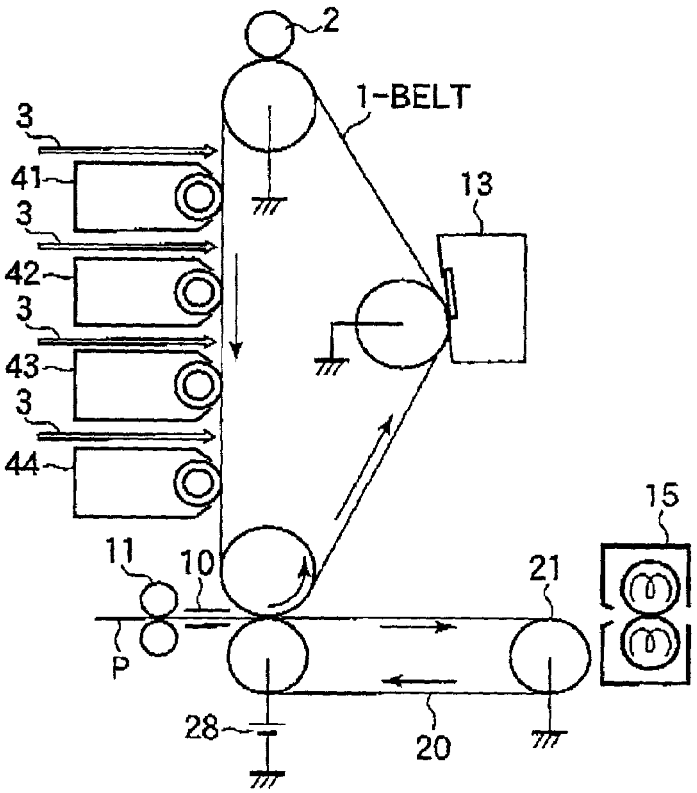
FIG. 4 illustrates an electrophotographic apparatus employing a belt-form electrophotographic photosensitive member and a transfer-transport belt.
Figure 8:
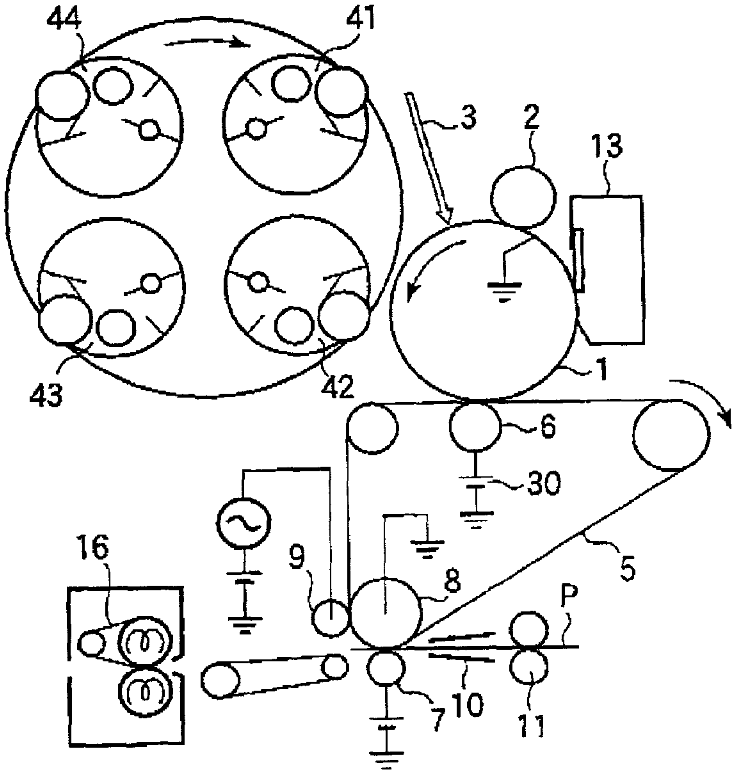
FIG. 8 illustrates an electrophotographic apparatus employing an intermediate transfer belt and a fixing belt.

For example, such other apparatus may include an electrophotographic apparatus which as shown in FIG. 2 makes use of a plurality of electrophotographic photosensitive members and an intermediate transfer belt; an electrophotographic apparatus in which toner images corresponding to a plurality of color components are superimposingly formed on a single photosensitive member and thereafter they are one time transferred to an intermediate transfer belt; an electrophotographic apparatus in which as shown FIG. 3 a transfer medium P is passed between a plurality of electrophotographic photosensitive members and an intermediate transfer belt to obtain an image; an electrophotographic apparatus in which as shown FIG. 4 a plurality of color toner images are formed on a belt-form electrophotographic photosensitive member and thereafter the toner images are one time transferred to a transfer medium P by means of a transfer-transport belt; and an electrophotographic apparatus which as shown in FIG. 8 makes use of a fixing belt 16 as a fixing member.

The electrophotographic belt member of the present invention by no means imposes any limitations on the construction of electrophotographic apparatus, and is applicable also to apparatus having construction other than the electrophotographic apparatus exemplified herein.

Incidentally, in the apparatus shown in FIGS. 2 to 4 and FIG. 8, members having the same functions as the members of the apparatus shown in FIG. 1 are denoted by like reference numerals, provided that reference numeral or symbol 1-Y in FIGS. 2 and 3 denotes an electrophotographic photosensitive member for yellow color; 1-M, an electrophotographic photosensitive member for magenta color; 1-C, an electrophotographic photosensitive member for cyan color; and 1-BK, an electrophotographic photosensitive member for black color. Reference numeral or symbol 1-BELT in FIG. 4 denotes a belt-form electrophotographic photosensitive member (photosensitive belt); and 16 in FIG. 8, the fixing belt. Reference numeral 21 in FIGS. 2 and 4 denotes a drive roller. Reference numeral 22 in FIGS. 2 and 3 denotes a transfer roller. Reference numeral 24 in FIG. 3 denotes a charging assembly. Reference numerals 27 and 28 in FIG. 2 denote bias power sources.

The present invention is described below in greater detail by giving Examples.

EXAMPLE 1

A compound (resin composition) formulated as shown in Table 1 was obtained by means of a twin-screw extruder. Kneading temperature was set at 200 to 210° C.

Figure 5:
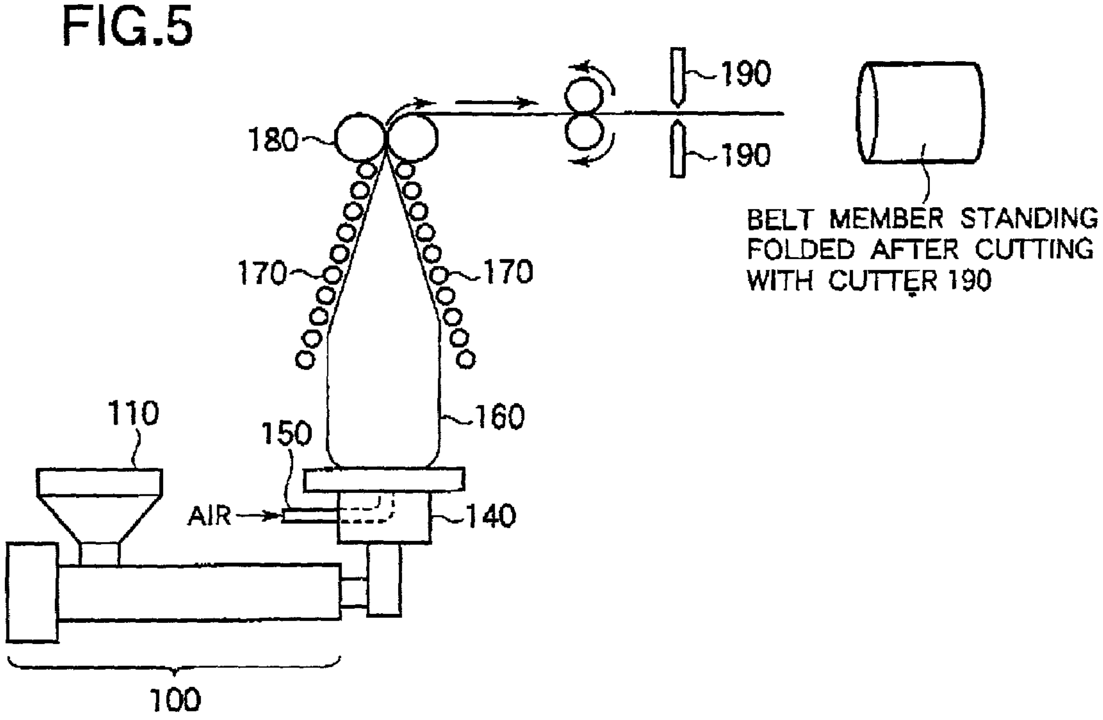
FIG. 5 is a schematic view of a blown-film extrusion apparatus.

The compound obtained was worked into pellets, which were then dried at 100° C. for at least 2 hours and thereafter put into a hopper 110 of an extruder 100 shown in FIG. 5. The extruder 100 was set at a temperature of 180 to 210° C. From the hopper 110, the compound put into it was led to a circular die having a die lip diameter D1 of 100 mm and a die gap of 300 μm, and was extruded into a tube from the circular die. Then, the tubular extruded product was inflated to a tube 160 by blowing air fed through a gas feed passage 150. The tube having been thus inflated had a diameter D2 of 140 mm, (D2/D1=1.4).

The tube 160 was taken off upward while being gradually compressed by a stabilizing plate 170. The drive source of take-off was pinch rolls 180. The pinch rolls were each 600 mm in diameter. The tube 160 was compressed by these rolls. Hence, the air fed to the interior of the tube 160 no longer leaked out from the tube. Thus, once the air was fed, the diameter of the tube 160 was kept constant, even though the air was not fed through the gas feed passage 150 thereafter.

The tube having passed the pinch rolls 180 came into a folded tubular form of 220 mm in flat width. Thereafter, the tube was intermittently cut with cutters 190 at an angle of ±10° in the direction of extrusion of the tube to obtain a tube of 100 μm in wall thickness and 300 mm in width (length).

Next, the tube thus obtained was placed on an aluminum cylinder of 142 mm in external diameter and 330 mm in length along its periphery.

A stainless-steel hollow cylinder of 142.21 mm in inner diameter and 330 mm in length was further fitted on the outside of the tube, followed by heating to 170° C. After the heating, the cylinder was cooled to 30° C. as it was kept fitted, and then the stainless-steel hollow cylinder and the aluminum cylinder were removed to obtain a belt of 140 mm in diameter.

As a result of the above secondary working carried out using two types of cylinders, the folds (caused by the pinch rolls) disappeared completely.

The belt thus obtained was cut in a width of 240 mm, and meandering preventive guides (ribs) were attached to edges, thus an electrophotographic belt member according to the present invention was obtained.

Incidentally, an edge reinforcing member and a meandering preventive member are attached to the electrophotographic belt member in some cases. As can be seen also from Table 1, however, materials for such members are not included in the resin composition of the present invention.

Figure 6:
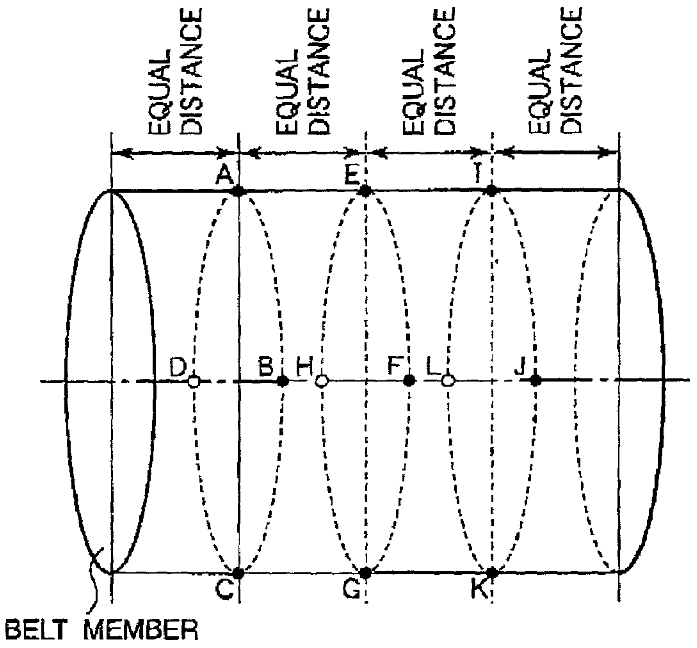
FIG. 6 is a view showing positions at which the electrical resistance of an electrophotographic belt member is measured.

Volume resistance and surface resistance of the electrophotographic belt member obtained were measured in the manner described previously, at twelve spots (four spots in its peripheral direction and three spots in its generatrix direction) of A to L shown in FIG. 6. in all Examples and Comparative Examples, the electrical resistance was measured in an environment of 23±2° C./55±5% RH.

The results of measurement are shown in Table 2.

In Table 2, the average value of volume resistance is meant to be the arithmetic mean value of volume resistances at spots A to L. The average value of surface resistance is meant to be the arithmetic mean value of surface resistances at spots A to L.

The scattering in the peripheral direction is meant to be the maximum value of X1, X2 and X3, where X1 represents the ratio of maximum value to minimum value of the measurements at spots A to D; X2, the ratio of maximum value to minimum value of the measurements at spots E to H; and X3, the ratio of maximum value to minimum value of the measurements at spots I to L.

The scattering in the generatrix direction is meant to be the maximum value of Y1, Y2, Y3 and Y4, where Y1 represents the ratio of maximum value to minimum value of the measurements at spots A, E and I; Y2. the ratio of maximum value to minimum value of the measurements at spots B, F and J; Y3, the ratio of maximum value to minimum value of the measurements at spots C, G and X: and Y4, the ratio of maximum value to minimum value of the measurements at spots D, H and L.

The peripheral length of the belt was also measured in environments of 15° C./10% RH (hereinafter "L/L" and 30° C./80% RH (hereinafter "H/H"), and its difference between them was determined. The results are shown in Table 2.

Next, the electrophotographic belt member obtained was set in the electrophotographic apparatus shown in FIG. 1. as the intermediate transfer belt 5, and images were reproduced in each of the environments of L/L and H/H. Since the difference in peripheral length of the belt depending on environment was small, the belt was well driven in both the environments.

Next, a running test on 50,000-sheet repeated use was made in a normal environment. As the result, any faulty transfer did not occur, the intermediate transfer belt 5 did not break, and color aberration occurred only slightly throughout the running, showing good results.

EXAMPLE 2

An electrophotographic belt member was obtained in the same manner as in Example 1 except that the formulation was changed to that shown in Table 1.

Because of the electrolyte added in a large quantity, the belt was slightly sticky, and stuck very slightly to the aluminum cylinder when drawn out therefrom in the secondary working, but not so much as to affect productivity.

The results of measurement of electrical resistance of the belt obtained are shown in Table 2.

The difference in peripheral length of the belt depending on environment was also measured in the same manner as in Example 1. The results are shown in Table 2.

Images were also reproduced in each of the environments of L/L and H/H in the same manner as in Example 1. Since the difference in peripheral length of the belt depending on environment was small, the belt was well drivable in both the environments.

Next, a running test was made in a normal environment in the same manner as in Example 1. Faulty transfer occurred very slightly because of a higher electrical resistance than that in Example 1, but at a level well tolerable in practical use. Also, the intermediate transfer belt 5 did not break, and color aberration occurred only slightly throughout the running, showing good results.

Since the belt was slightly sticky, the transfer residual toner became deposited to solidify (melt-adhered) on the belt surface to slightly cause faulty images (faulty transfer) corresponding to that part, which, however, occurred slightly compared with the level of melt adhesion in Comparative Example 1 or Comparative Example 2, and at a level of no problem in practical use.

EXAMPLE 3

An electrophotographic belt member was obtained in the same manner as in Example 1 except that the formulation was changed to that shown in Table 1. The results of measurement of electrical resistance of the belt obtained are shown in Table 2.

The difference in peripheral length of the belt depending on environment was also measured in the same manner as in Example 1. The results are shown in Table 2.

Images were also reproduced in each of the environments of L/L and H/H in the same manner as in Example 1. Since the difference in peripheral length of the belt depending on environment was small, the belt was well drivable in both the environments.

Next, a running test was made in a normal environment in the same manner as in Example 1. Because of the insulating filler compounded in a large quantity, the belt was hard and, although good results were obtained in respect of color aberration, slight cracks were seen to have occurred at edges after the 50,000-sheet running was finished. However, the slight cracks caused any difficulties on neither the operation of the electrophotographic apparatus nor image quality.

EXAMPLE 4

An electrophotographic belt member was obtained in the same manner as in Example 1 except that the formulation was changed to that shown in Table 1. The results of measurement of electrical resistance of the belt obtained are shown in Table 2.

In the present Example, carbon black was added in an amount of 1.5% by weight, but the electrical resistance little changed compared with that in Example 1.

The difference in peripheral length of the belt depending on environment was also measured in the same manner as in Example 1. The results are shown in Table 2.

Images were also reproduced in each of the environments of L/L and H/H in the same manner as in Example 1. Since the difference in peripheral length of the belt depending on environment was small, the belt was well drivable in both the environments.

Next, a running test was made in a normal environment in the same manner as in Example 1. As the result, any faulty transfer did not occur, the intermediate transfer belt 5 did not break, and color aberration occurred only slightly throughout the running, showing good results.

The intermediate transfer belt on which the 50,000-sheet running was finished did not cause any insulation breakdown like that in Comparative Example 7. Namely, the aim at superior dielectric strength in the present invention was achievable also in the present Example. This was considered due to the fact that not the carbon black contributed to the lowering of electrical resistance of the resin composition but the polyether-ester amide performed the regulation of electrical resistance.

EXAMPLE 5

A compound (resin composition) formulated as shown in Table 1 was obtained by means of a twin-screw extruder. Kneading temperature was set at 200 to 210° C.

Figure 7:
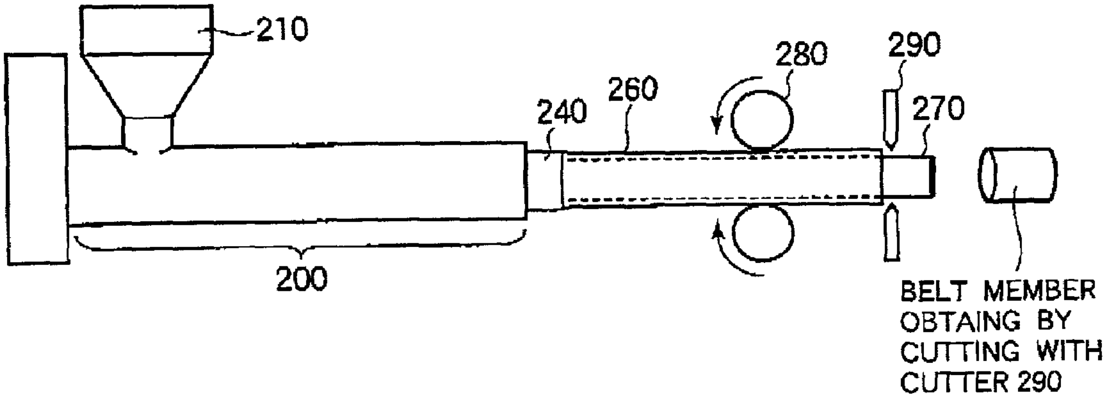
FIG. 7 is a schematic view of a tube extruder.

The compound obtained was worked into pellets, which were then dried at 100° C. for at least 2 hours and thereafter put into a hopper 110 of an extruder 200 shown in FIG. 7. The extruder 200 was set at a temperature of 180 to 210° C. From the hopper 210, the compound put into it was led to a circular die having a die lip diameter D1 of 150 mm and a die gap of 200 μm, and was horizontally extruded and led to a mandrel 270, where the tube 260 extruded was cooled. The tube 260 having been thus cooled had a diameter D2 of 140 mm. (D2/D1=0.93). In FIG. 7, reference numeral 240 denotes the circular die.

The tube 260 having passed the mandrel 270 was taken off by take-off rollers 280. Thereafter, the tube was intermittently cut with a cutter 290 at an angle of ±5° in the direction of extrusion of the tube to obtain a tube of 100 μm in wall thickness and 300 mm in length.

The tube thus obtained was placed on an aluminum cylinder of 141 mm in external diameter and 330 mm in length along its periphery. The tube was heated at 150° C. for 15 minutes and then cooled (secondary working), where the tube was taken apart. Finally, the belt was cut in a width of 240 mm, and ribs were attached to edges, thus an electrophotographic belt member according to the present invention was obtained.

The results of measurement of electrical resistance of the belt obtained are shown in Table 2.

The difference in peripheral length of the belt depending on environment was also measured in the same manner as in Example 1. The results are shown in Table 2.

Images were also reproduced in each of the environments of L/L and H/H in the same manner as in Example 1. Since the difference in peripheral length of the belt depending on environment was small, the belt was well drivable in both the environments.

Since the manner of secondary working was different from that in Example 1 and any mold was not pressed against the periphery of the tube, folds caused by the pinch rolls (take-off rollers 280) remained at the surface of the electrophotographic belt member, and slight density unevenness was seen at the part corresponding to the folds. The density unevenness, however, was very slight and was at a level well tolerable in practical use.

Next, a running test was made in a normal environment in the same manner as in Example 1. As the result, the intermediate transfer belt 5 did not break, and color aberration occurred only slightly throughout the running, showing good results.

EXAMPLE 6

A compound (resin composition) formulated as shown in Table 1 was obtained by means of a twin-screw extruder. Kneading temperature was set at 240 to 250° C.

The compound obtained was worked into pellets, which were then dried at 120° C. for at least 2 hours. Thereafter, blown-film extrusion was carried out in the same manner as in Example 1 except that the extrusion temperature was set at 240 to 250° C., to obtain a tube of 150 μm in wall thickness and 280 mm in length.

The tube thus obtained was subjected to secondary working in the same manner as in Example 5, thus an electrophotographic belt member according to the present invention was obtained.

The results of measurement of electrical resistance of the belt obtained are shown in Table 2.

The difference in peripheral length of the belt depending on environment was also measured in the same manner as in Example 1. The results are shown in Table 2.

The electrophotographic belt member obtained was further set in the electrophotographic apparatus shown in FIG. 7, as the transfer-transport belt 20, and images were reproduced in each of the environments of L/L and H/H. Since the difference in peripheral length of the belt depending on environment was small, the belt was well drivable in both the environments.

Since the manner of secondary working was different from that in Example 1 and any mold was not pressed against the periphery of the tube, folds caused by the pinch rolls remained at the surface of the electrophotographic belt member, and slight density unevenness was seen at the part corresponding to the folds. The density unevenness, however, was very slight and was at a level well tolerable in practical use.

Next, the electrophotographic belt member obtained was set in the electrophotographic apparatus shown in FIG. 7, as the transfer-transport belt 20, and a running test was made in a normal environment in the same manner as in Example 1. As the result, the transfer-transport belt 20 did not break, and color aberration occurred only slightly throughout the running, showing good results.

In the present Example, because of the polyether-ester amide compounded in a large quantity, the belt was slightly sticky. This caused melt adhesion very slightly, but at a level of no problem in practical use.

EXAMPLE 7

A compound (resin composition) formulated as shown in Table 1 was obtained by means of a twin-screw extruder. Kneading temperature was set at 240 to 250° C.

The compound obtained was worked into pellets, which were then dried at 120° C. for at least 2 hours. Thereafter, blown-film extrusion was carried out in the same manner as in Example 1 except that the extrusion temperature was set at 240 to 250° C. to obtain a tube of 150 μm in wall thickness and 280 mm in length.

The tube thus obtained was subjected to secondary working in the same manner as in Example 1, thus an electrophotographic belt member according to the present invention was obtained.

The results of measurement of electrical resistance of the belt obtained are shown in Table 2.

The difference in peripheral length of the belt depending on environment was also measured in the same manner as in Example 1. The results are shown in Table 2.

Images were also reproduced in each of the environments of L/L and H/H in the same manner as in Example 1. Since the difference in peripheral length of the belt depending on environment was small, the belt was well drivable in both the environments.

Next, a running test was made in a normal environment in the same manner as in Example 1. Since the belt had a higher electrical resistance than that of Example 1, very slight faulty transfer was seen, but at a level well tolerable in practical use. Also, the intermediate transfer belt 5 did not break, and color aberration occurred only slightly throughout the running, showing good results.

EXAMPLE 8

A compound (resin composition) formulated as shown in Table 1 was obtained by means of a twin-screw extruder. Kneading temperature was set at 200 to 210° C.

The compound obtained was worked into pellets, which were then dried at 100° C. for at least 2 hours. Thereafter, blown-film extrusion was carried out in the same manner as in Example 1, to obtain a tube of 100 μm in wall thickness and 300 mm in length.

The tube thus obtained was subjected to secondary working in the same manner as in Example 1, thus an electrophotographic belt member according to the present invention was obtained.

The results of measurement of electrical resistance of the belt obtained are shown in Table 2.

The difference in peripheral length of the belt depending on environment was also measured in the same manner as in Example 1. The results are shown in Table 2.

Images were also reproduced in each of the environments of L/L and H/H in the same manner as in Example 1. Since the difference in peripheral length of the belt depending on environment was small, the belt was well drivable in both the environments.

Next, a running test was made in a normal environment in the same manner as in Example 1. in the present Example, the polyether-ester amide was compounded in a large quantity, but at the same time the insulating filler was also compounded. Hence, the belt was not sticky and any melt adhesion occurred. Also, the intermediate transfer belt 5 did not break, and color aberration occurred only slightly throughout the running, showing good results.

EXAMPLE 9

A compound (resin composition) formulated as shown in Table 1 was obtained by means of a twin-screw extruder. Kneading temperature was set at 200 to 210° C.

The compound obtained was worked into pellets, which were then dried at 100° C. for at least 2 hours. Thereafter, blown-film extrusion was carried out in the same manner as in Example 1, to obtain a tube of 100 μm in wall thickness and 300 mm in length.

The tube thus obtained was subjected to secondary working in the same manner as in Example 1, thus an electrophotographic belt member according to the present invention was obtained.

The results of measurement of electrical resistance of the belt obtained are shown in Table 2.

The difference in peripheral length of the belt depending on environment was also measured in the same manner as in Example 1. The results are shown in Table 2.

Images were also reproduced in each of the environments of L/L and H/H in the same manner as in Example 1. Since the difference in peripheral length of the belt depending on environment was small, the belt was well drivable in both the environments.

Next, a running test was made in a normal environment in the same manner as in Example 1. The intermediate transfer belt 5 did not break, and color aberration occurred only slightly throughout the running, showing good results.

EXAMPLE 10

An electrophotographic belt member was obtained in the same manner as in Example 1 except that the formulation was changed to that shown in Table 1. The results of measurement of electrical resistance of the belt obtained are shown in Table 2.

In the present Example, carbon black was added in an amount of 8% by weight. The volume resistance lowered by 1.3 figures compared with that in Example 1.

The difference in peripheral length of the belt depending on environment was also measured in the same manner as in Example 1. The results are shown in Table 2.

Images were also reproduced in each of the environments of L/L and H/H in the same manner as in Example 1. Since the difference in peripheral length of the belt depending on environment was small, the belt was well drivable in both the environments.

Next, a running test was made in a normal environment in the same manner as in Example 1. As the result, any faulty transfer did not occur, the intermediate transfer belt 5 did not break, and color aberration occurred only slightly throughout the running, showing good results.

The intermediate transfer belt on which the 50,000-sheet running was finished did not cause any insulation breakdown like that in Comparative Example 7. Namely, the aim at superior dielectric strength in the present invention was achievable also in the present Example. This was considered due to the fact that the carbon black little contributed to the lowering of electrical resistance of the resin composition and the polyether-ester amide chiefly performed the regulation of electrical resistance.

EXAMPLE 11

An electrophotographic belt member was obtained in the same manner as in Example 1 except that the formulation was changed to that shown in Table 1.

In the present Example, the belt had a volume resistance which was lower by about 0.95 figures $[\log(8\times10^6)-\log(9\times10^5)]$ than that in Comparative Example 1. This is considered due to the water adsorbed on the filler I, which has lowered the electrical resistance of the resin composition. Compared with Example 2, in which the conducting agent D is added in a small quantity, it is clear that the volume resistance of the resin composition in the present Example is lowered chiefly by the conducting agent D.

The belt obtained was evaluated in the same manner as in Example 1. The results are shown in Table 2.

The belt was drivable in both the environments of L/L and H/H.

Because of the insulating filler compounded in a large quantity, the belt was hard and, although good results were obtained in respect of color aberration, slight cracks were seen to have occurred at edges after the 50,000-sheet running was finished. However, the slight cracks caused any difficulties on neither the operation of the electrophotographic apparatus nor image quality.

EXAMPLE 12

The electrophotographic belt member described in Example 10 was used as a substrate of a photosensitive belt. More specifically, the electrophotographic belt member described in Example 10 was provided on its surface with a charge generation layer and a charge transport layer to obtain the photosensitive belt of the present Example. The belt obtained in Example 10 was set in the electrophotographic apparatus shown in FIG. 4, as the transfer-transport belt, and the photosensitive belt of the present Example was also set in the electrophotographic apparatus shown in FIG. 4, and images were reproduced. As the result, good images were obtained.

EXAMPLE 13

In the present Example, the electrophotographic belt member described in Example 10 was used as a substrate of a fixing belt. More specifically, the electrophotographic belt member described in Example 10 was coated on its surface with a fluorine rubber coating material having fine fluorine resin particles dispersed therein, which was so coated as to provide a dried coating thickness of 10 μm, to obtain the fixing belt of the present Example.

The fixing belt thus obtained was set in the electrophotographic apparatus shown in FIG. 8, and images were reproduced. As the result, good images were obtained.

Comparative Example 1

An electrophotographic belt member was obtained in the same manner as in Example 1 except that the formulation was changed to that shown in Table 1. The results of measurement of electrical resistance of the belt obtained are shown in Table 2.

The difference in peripheral length of the belt depending on environment was also measured in the same manner as in Example 1. The results are shown in Table 2.

Images were also reproduced in each of the environments of L/L and H/H in the same manner as in Example 1. Since the difference in peripheral length of the belt depending on environment was great, the belt became undrivable in L/L (a drive motor became out-of-condition), and the belt slipped in H/H to cause color aberration greatly.

Next, a running test was made in a normal environment in the same manner as in Example 1. As the result, because of the belt having no rigidity (a low Young's modulus in the peripheral direction), color aberration began to occur greatly on about 10,000th and subsequent sheets in the running test, and the color aberration occurred fairly greatly after the running on 50,000 sheets.

Since the belt was slightly sticky, the transfer residual toner also became deposited to solidify (melt-adhered) on the belt surface to cause faulty images (faulty transfer) corresponding to that part.

No cracks were produced in the belt in the 50,000-sheet running test.

Comparative Example 2

An electrophotographic belt member was obtained in the same manner as in Example 1 except that the formulation was changed to that shown in Table 1. The results of measurement of electrical resistance of the belt obtained are shown in Table 2.

The difference in peripheral length of the belt depending on environment was also measured in the same manner as in Example 1. The results are shown in Table 2.

Images were also reproduced in each of the environments of L/L and H/H in the same manner as in Example 1. Since the difference in peripheral length of the belt depending on environment was a little great, the belt was drivable in L/L but the belt slipped in H/H to cause color aberration greatly.

Next, a running test was made in a normal environment in the same manner as in Example 1. As the result, because of the belt having no rigidity (a low Young's modulus in the peripheral direction), color aberration began to occur greatly on about 10.000th and subsequent sheets in the running test, and the color aberration occurred fairly greatly after the running on 50,000 sheets.

Since the belt was slightly sticky, the transfer residual toner also became deposited to solidify (melt-adhered) on the belt surface to cause faulty images (faulty transfer) corresponding to that part. The faulty images were at a level slightly better than that in Comparative Example 1.

No cracks were produced in the belt in the 50,000-sheet running test.

Comparative Example 3

An electrophotographic belt member was obtained in the same manner as in Example 1 except that the formulation was changed to that shown in Table 1. The results of measurement of electrical resistance of the belt obtained are shown in Table 2. Since in the present Comparative Example the conducting agent was compounded in a small quantity, the belt obtained had a high electrical resistance.

The difference in peripheral length of the belt depending on environment was also measured in the same manner as in Example 1. The results are shown in Table 2.

Images were also reproduced in each of the environments of L/L and H/H in the same manner as in Example 1. Since the difference in peripheral length of the belt depending on environment was small, the belt was well drivable in both the environments.

Next, a running test was made in a normal environment in the same manner as in Example 1. As the result, good results were obtained in respect of color aberration throughout the running, but, because of the belt having a high electrical resistance, faulty transfer occurred. The like phenomenon was slightly seen also in Example 2, but, compared with Example 2, image quality was apparently poor (image density was uneven, showing a low density as a whole).

No cracks were produced in the belt in the 50,000-sheet running test.

Comparative Example 4

An electrophotographic belt member was obtained in the same manner as in Example 1 except that the formulation was changed to that shown in Table 1. The results of measurement of electrical resistance of the belt obtained are shown in Table 2.

The difference in peripheral length of the belt depending on environment was also measured in the same manner as in Example 1. The results are shown in Table 2.

Images were also reproduced in each of the environments of L/L and H/H in the same manner as in Example 1. Since the difference in peripheral length of the belt depending on environment was small, the belt was well drivable in both the environments.

Next, a running test was made in a normal environment in the same manner as in Example 1. As the result, because of the insulating filler compounded in a large quantity in the present Comparative Example. the belt obtained had a very high rigidity. Hence, although good results were obtained in respect of color aberration in the initial stage of the running, the belt was so brittle that cracks began to be produced in the belt on about 10,000-sheet running, and became broken on 15,000-sheet running.

Comparative Example 5

An electrophotographic belt member was obtained in the same manner as in Example 6 except that the formulation was changed to that shown in Table 1. The results of measurement of electrical resistance of the belt obtained are shown in Table 2.

The difference in peripheral length of the belt depending on environment was also measured in the same manner as in Example 1. The results are shown in Table 2.

Images were also reproduced in each of the environments of L/L and H/H in the same manner as in Example 1. Since the difference in peripheral length of the belt depending on environment was a little great, the belt was drivable in L/L but the belt slipped in H/H to cause color aberration greatly.

Next, a running test was made in a normal environment in the same manner as in Example 1. As the result, because of the polyether-ester amide compounded in a large quantity in the present Comparative Example, the belt obtained had a very low rigidity. Also, the belt was sticky. Hence, color aberration occurred greatly from the beginning. Still also, the belt creeped with progress of the running to lower the belt tension, so that the color aberration occurred more greatly. Moreover, the melt adhesion occurred at a fairly poor level to cause faulty images as compared with Example 6.

No cracks were produced in the belt in the 50,000-sheet running test.

Comparative Example 6

An electrophotographic belt member was obtained in the same manner as in Example 1 except that the formulation was changed to that shown in Table 1. The results of measurement of electrical resistance of the belt obtained are shown in Table 2.

The difference in peripheral length of the belt depending on environment was also measured in the same manner as in Example 1. The results are shown in Table 2.

Images were also reproduced in each of the environments of L/L and H/H in the same manner as in Example 1. Since the difference in peripheral length of the belt depending on environment was small, the belt was well drivable in both the environments.

Next, a running test was made in a normal environment in the same manner as in Example 1. Good results were obtained in respect of color aberration, and no cracks were produced in the belt in the 50,000-sheet running test.

However, because of the belt being sticky, the transfer efficiency was poor from the beginning, and image density was lowest among any other Examples and Comparative Examples. Also, the melt adhesion occurred at a poorer level than that in Comparative Example 5.

In addition, because of the electrolyte added in an amount as large as 6% by weight, the belt stuck to the aluminum cylinder at the time of secondary working, and it was very difficult for the tube to be taken apart without wrinkling.

Comparative Example 7

An electrophotographic belt member was obtained in the same manner as in Example 1 except that the formulation was changed to that shown in Table 1. The results of measurement of electrical resistance of the belt obtained are shown in Table 2.

Since in the present Comparative Example the electrical resistance was regulated by adding carbon black, the belt had a great scattering in electrical resistance.

The difference in peripheral length of the belt depending on environment was also measured in the same manner as in Example 1. The results are shown in Table 2.

Images were also reproduced in each of the environments of L/L and H/H in the same manner as in Example 1. Since the difference in peripheral length of the belt depending on environment was small, the belt was well drivable in both the environments.

Next, a running test was made in a normal environment in the same manner as in Example 1. Good results were obtained in respect of color aberration, but cracks were produced in the belt at its edges on about 40,000th sheet running. On 50,000th sheet running, the cracks grown up to the image area to cause faulty transfer at the cracked portions.

In addition, after the 50,000-sheet running, the belt had caused insulation breakdown. It was only the present Comparative Example that caused the insulation breakdown.

Comparative Example 8

An electrophotographic belt member was obtained in the same manner as in Example 1 except that the formulation was changed to that shown in Table 1. The results of measurement of electrical resistance of the belt obtained are shown in Table 2.

The difference in peripheral length of the belt depending on environment was also measured in the same manner as in Example 1. The results are shown in Table 2.

Images were also reproduced in each of the environments of L/L and H/H in the same manner as in Example 1. Since the difference in peripheral length of the belt depending on environment was small, the belt was well drivable in both the environments.

Next, a running test was made in a normal environment in the same manner as in Example 1. Good results were obtained in respect of color aberration, but, because the belt did not contained the polyether-ester amide, polyether ester or polyether amide, a resistance to flexing was not good and cracks were produced in the belt at its edges on about 40,000th sheet running. On 50,000th sheet running, the cracks grown up to the image area to cause faulty transfer at the cracked portions.

The belt also had a high electrical resistance, image density was uneven like Comparative Example 3, showing a low density as a whole.

TABLE 1

| | Thermoplastic resin | | | Conducting agent | | | | | Insulating filler | | Other components | | | |
|---|---|---|---|---|---|---|---|---|---|---|---|---|---|---|
| | A | B | C | D | E | F | G | H | I | J | K | L | M | N |
| Example: | | | | | | | | | | | | | | |
| 1 | 74 | — | — | 13 | — | — | — | — | 13 | — | — | — | — | — |
| 2 | 90 | — | — | 2 | — | — | 5 | — | 2 | — | — | 1 | — | — |
| 3 | 30 | — | — | — | 10 | 10 | — | — | 50 | — | — | — | — | — |
| 4 | 72.5 | — | — | 13 | — | — | — | — | 13 | — | 1.5 | — | — | — |
| 5 | 50 | — | 14 | 15 | — | — | — | — | 10 | 10 | — | — | 1 | — |
| 6 | — | 43 | — | 30 | — | — | — | — | 15 | — | — | 1 | 1 | 10 |
| 7 | — | 71 | — | 2 | — | — | 3 | — | 2 | — | — | 1 | 1 | 20 |
| 8 | 70 | — | — | 25 | — | — | — | — | 5 | — | — | — | — | — |
| 9 | 80 | — | — | — | 10 | — | 1 | — | 9 | — | — | — | — | — |
| 10 | 66 | — | — | 13 | — | — | — | — | 13 | — | 8 | — | — | — |
| 11 | 25 | — | — | 25 | — | — | — | — | 50 | — | — | — | — | — |
| Comparative Example: | | | | | | | | | | | | | | |
| 1 | 75 | — | — | 25 | — | — | — | — | — | — | — | — | — | — |
| 2 | 74 | — | — | 25 | — | — | — | — | 1 | — | — | — | — | — |
| 3 | 90 | — | — | 1 | — | — | — | — | 9 | — | — | — | — | — |
| 4 | 25 | — | — | 15 | — | — | — | — | 60 | — | — | — | — | — |
| 5 | 38 | — | — | 35 | — | — | — | — | 15 | — | — | 1 | 1 | 10 |
| 6 | 89 | — | — | 2 | — | — | 6 | 6 | 2 | — | — | 1 | — | — |
| 7 | 87.8 | — | — | — | — | — | 0.2 | 12 | — | — | — | — | — | — |
| 8 | 85 | — | — | — | — | — | 2 | — | 13 | — | — | — | — | — |

Unit: % by weight

A: Polyvinylidene fluoride
B: Polycarbonate
C: Polymethacrylate
D: Polyether-ester amide
E: Polyether ester
F: Polyether amide
G: Lithium perfluoroalkylsulfonate (electrolyte)
H: Carbon black (average particle diameter of primary particles: 20 nm)
I: Zinc oxide (average particle diameter: 0.6 μm)
J: Phenol resin particles (av. particle diam.: 10 μm)
K: Carbon black (average particle diameter of primary particles: 40 nm)
L: Silicone-type internal release agent
M: Phosphorus-type antioxidant
N: Phosphorus-type flame retardant

TABLE 2

| | Volume resistance | | | Surface resistance | | | Belt peripheral length |
|---|---|---|---|---|---|---|---|
| | Average value (Ω) | Peripheral direction scattering | Generatrix direction scattering | Average value (Ω) | Peripheral direction scattering | Generatrix direction scattering | difference between L/L and H/H |
| Example: | | | | | | | |
| 1 | $2 \times 10^{7}$ | 2.5 | 1.8 | $6 \times 10^{9}$ | 4.5 | 3.8 | 1.6 |
| 2 | $2 \times 10^{10}$ | 1.7 | 1.6 | $5 \times 10^{12}$ | 3.2 | 2.9 | 1.2 |
| 3 | $1 \times 10^{7}$ | 3.0 | 2.8 | $2 \times 10^{9}$ | 4.5 | 3.5 | 1.8 |
| 4 | $2 \times 10^{7}$ | 2.7 | 1.7 | $7 \times 10^{9}$ | 4.3 | 3.9 | 1.6 |
| 5 | $1 \times 10^{8}$ | 3.5 | 3.4 | $2 \times 10^{10}$ | 5.0 | 4.6 | 2.0 |
| 6 | $7 \times 10^{8}$ | 4.2 | 3.8 | $1 \times 10^{11}$ | 6.2 | 5.3 | 2.0 |
| 7 | $6 \times 10^{10}$ | 5.1 | 4.9 | $1 \times 10^{13}$ | 6.3 | 4.1 | 0.9 |
| 8 | $8 \times 10^{6}$ | 3.1 | 2.9 | $2 \times 10^{9}$ | 4.3 | 3.5 | 2.3 |
| 9 | $3 \times 10^{7}$ | 3.8 | 4.5 | $6 \times 10^{9}$ | 4.1 | 3.5 | 1.5 |
| 10 | $1 \times 10^{6}$ | 12.5 | 18.6 | $4 \times 10^{8}$ | 25.1 | 31.5 | 1.5 |
| 11 | $9 \times 10^{5}$ | 3.5 | 3.1 | $1 \times 10^{8}$ | 4.3 | 3.5 | 1.6 |
| Comparative Example: | | | | | | | |
| 1 | $8 \times 10^{6}$ | 3.2 | 2.8 | $1 \times 10^{9}$ | 4.1 | 3.8 | 3.0 |
| 2 | $8 \times 10^{6}$ | 3.1 | 2.9 | $1 \times 10^{9}$ | 4.2 | 3.6 | 2.8 |
| 3 | $2 \times 10^{11}$ | 2.6 | 2.1 | $3 \times 10^{13}$ | 3.2 | 3.1 | 1.3 |
| 4 | $9 \times 10^{6}$ | 3.8 | 3.6 | $1 \times 10^{9}$ | 4.1 | 4.0 | 1.3 |
| 5 | $7 \times 10^{6}$ | 3.1 | 3.0 | $8 \times 10^{8}$ | 4.0 | 3.9 | 2.8 |
| 6 | $1 \times 10^{10}$ | 3.4 | 2.9 | $2 \times 10^{12}$ | 2.8 | 2.1 | 1.2 |
| 7 | $1 \times 10^{8}$ | 150 | 170 | $2 \times 10^{10}$ | 250 | 310 | 1.0 |
| 8 | $3 \times 10^{11}$ | 2.4 | 2.5 | $5 \times 10^{13}$ | 1.8 | 1.7 | 1.0 |

As having been described above, the present invention can provide an electrophotographic belt member which:

1) has a good resistance to creep;
2) has a good resistance to flexing;
3) has a good uniformity in electrical resistance;
4) has a high breakdown strength;
5) may less cause a change in belt peripheral length due to service environment; and
6) has a low cost;

a process for producing the electrophotographic belt member, and an electrophotographic apparatus having the electrophotographic belt member.

What is claimed is:

1. A single layer electrophotographic belt member having a volume resistance from $10^{0}\Omega$ to $10^{14}\Omega$ comprising a resin composition, wherein said resin composition contains:

(a) from 30% by weight to 90% by weight of a thermoplastic resin;

(b) from 2% by weight to 30% by weight of a compound selected from the group consisting of a polyether-ester amide, a polyether ester and a polyether amide;

(c) from 0% by weight to 5% by weight of an electrolyte; and (d) from 2% by weight to 50% by weight of an insulating filler, wherein the compound acts as a conducting agent and the electrolyte acts to lower electrical resistance and wherein (i) a wall thickness of said electrophotographic belt member is from 50 μm to 300 μm, (ii) a maximum value of volume resistance in a peripheral direction of the electrophotographic belt member is within 100 times a minimum value thereof, (iii) a maximum value of volume resistance in a generatrix direction of the electrophotographic belt member is within 100 times a minimum value thereof, (iv) a maximum value of surface resistance in a peripheral direction of the electrophotographic belt member is within 100 times a minimum value thereof, (v) a maximum value of surface resistance in a generatrix direction of the electrophotographic belt member is within 100 times a minimum value thereof, and wherein the volume resistance (A) of the belt member and the volume resistance (B) of the belt member from which the insulating filler is removed, satisfies the equation $(B)/(A)<10$ and the insulating filler is selected from the group consisting of barium sulfate, calcium sulfate, barium titanate, potassium titanate, titanium oxide, magnesium oxide, magnesium hydroxide, aluminum hydroxide, talc, kaolin, hydrotalcite, silica, alumina, ferrite, calcium carbonate, barium carbonate, nickel carbonate, alumina fiber, potassium titanate fiber and fine particles of second thermoplastic resins.

2. The electrophotographic belt member according to claim 1, wherein said resin composition contains said thermoplastic resin in an amount of from 30% by weight to 74% by weight.

3. The electrophotographic belt member according to claim 1, wherein said thermoplastic resin comprises polyvinylidene fluoride or a vinylidene fluoride copolymer.

4. The electrophotographic belt member according to claim 1, which is an intermediate transfer belt.

5. The electrophotographic belt member according to claim 1, which is a transfer-transport belt.

6. The electrophotographic belt member according to claim 1, which is a substrate of a photosensitive belt.

7. The electrophotographic belt member according to claim 1, which is a fixing belt.

8. The electrophotographic belt member according to claim 1, which is a substrate of a fixing belt.

9. An electrophotographic apparatus comprising a single layer electrophotographic belt member having a volume resistance from $10^0$ Ω to $10^{14}$ Ω and comprises a resin composition, wherein the resin composition contains:

(a) from 30% by weight to 90% by weight of a thermoplastic resin;

(b) from 2% by weight to 30% by weight of a compound selected from the group consisting of a polyether-ester amide, a polyether ester and a polyether amide;

(c) from 0% by weight to 5% by weight of an electrolyte; and (d) from 2% by weight to 50% by weight of an insulating filler, wherein the compound acts as a conducting agent and the electrolyte acts to lower electrical resistance and wherein (i) a wall thickness of said electrophotographic belt member is from 50 μm to 300 μm, (ii) a maximum value of volume resistance in a peripheral direction of the electrophotographic belt member is within 100 times a minimum value thereof, (iii) a maximum value of volume resistance in a generatrix direction of the electrophotographic belt member is within 100 times a minimum value thereof, (iv) a maximum value of surface resistance in a peripheral direction of the electrophotographic belt member is within 100 times a minimum value thereof, (v) a maximum value of surface resistance in a generatrix direction of the electrophotographic belt member is within 100 times a minimum value thereof, and wherein the volume resistance (A) of the belt member and the volume resistance B of the belt member from which the insulating filler is removed, satisfies the equation (B)/(A)<10 and the insulating filler is selected from the group consisting of barium sulfate, calcium sulfate, barium titanate, potassium titanate, titanium oxide, magnesium oxide, magnesium hydroxide, aluminum hydroxide, talc, kaolin, hydrotalcite, silica, alumina, ferrite, calcium carbonate, barium carbonate, nickel carbonate, alumina fiber, potassium titanate fiber and fine particles of second thermoplastic resins.

10. A single layer electrophotographic belt member having a volume resistance from $10^0$Ω to $10^{14}$ Ω comprising a resin composition, wherein said resin composition contains:

(a) from 30% by weight to 90% by weight of a thermoplastic resin;

(b) from 2% by weight to 30% by weight of a compound selected from the group consisting of a polyether-ester amide, a polyether ester and a polyether amide;

(c) from 0% by weight to 5% by weight of an electrolyte; and (d) from 2% by weight to 50% by weight of an insulating zinc oxide filler; wherein the compound acts as a conducting agent and the electrolyte acts to lower electrical resistance and wherein (i) a wall thickness of said electrophotographic belt member is from 50 μm to 300 μm, (ii) a maximum value of volume resistance in a peripheral direction of the electrophotographic belt member is within 100 times a minimum value of thereof, (iii) a maximum value of volume resistance in a generatrix direction of the electrophotographic belt member is within 100 times a minimum value thereof, (iv) a maximum value of surface resistance in a peripheral direction of the electrophotographic belt member is within 100 times a minimum value thereof, and (v) a maximum value of surface resistance in a generatrix direction of the electrophotographic belt member is within 100 times a minimum value thereof, and wherein the volume resistance (A) of the belt member and the volume resistance (B) of the belt member from which the insulating zinc oxide is removed satisfies the equation (B)/(A)<10.

11. An electrophotographic apparatus comprising a single layer electrophotographic belt member having a volume resistance from $10^0$ Ω to $10^{14}$ Ω and comprises a resin composition, wherein the resin composition contains:

(a) from 30% by weight to 90% by weight of a thermoplastic resin;

(b) from 2% by weight to 30% by weight of a compound selected from the group consisting of a polyether-ester amide, a polyether ester and a polyether amide;

(c) from 0% by weight to 5% by weight of an electrolyte; and (d) from 2% by weight to 50% by weight of an insulating zinc oxide filler; wherein the compound acts as a conducting agent and the electrolyte acts to lower electrical resistance and wherein (i) a wall thickness said electrophotographic belt member from 50 μm to 300 μm, (ii) a maximum value of volume resistance in a peripheral direction of the electrophotographic belt member is within 100 times a minimum value thereof, (iii) a maximum value of volume resistance in a generatrix direction of the electrophotographic belt member is within 100 times a minimum value thereof, (iv) a maximum value of surface resistance in a peripheral direction of the electrophotographic belt member is within 100 times a minimum value thereof, and (v) a maximum value of surface resistance in a generatrix direction of the electrophotographic belt member is within 100 times a minimum value thereof; and wherein the volume resistance (A) of the belt member and the volume resistance (B) of the belt member from which the insulating zinc oxide is removed satisfies the equation (B)/(A)<10.

12. A single layer electrophotographic belt member having a volume resistance from $10^0$Ω to $10^{14}$ Ω consisting essentially of:

(a) from 30% by weight to 90% by weight of a thermoplastic resin;

(b) from 2% by weight to 30% by weight of a compound selected from the group consisting of a polyether-ester amide, a polyether ester and a polyether amide;

(c) from 0% by weight to 5% by weight of an electrolyte; and (d) from 2% by weight to 50% by weight of an insulating filler;

wherein the compound acts as a conducting agent and the electrolyte acts to lower electrical resistance; and wherein (i) a wall thickness of said electrophotographic belt member is from 50 μm to 300 μm, (ii) a maximum value of volume resistance in a peripheral direction of the electrophotographic belt member is within 100 times a minimum value thereof, (iii) a maximum value of surface resistance in a peripheral direction of the electrophotographic belt member is within 100 times a minimum value thereof, and (iv) a maximum value of surface resistance in a generatrix direction of the electrophotographic belt member is within 100 times a minimum value thereof; and wherein the volume resistance (A) of the belt member and the volume resistance (B) of the belt member from which the insulating filler is removed, satisfies the equation (B)/(A)<10 and the insulating filler is selected from the group consisting of zinc oxide, barium sulfate, calcium sulfate, barium titanate, potassium titanate, titanium oxide, magnesium oxide, magnesium hydroxide, aluminum hydroxide, talc, kaolin, hydrotalcite, silica, alumina, ferrite, calcium carbonate, barium carbonate, nickel carbonate, alumina fiber, potassium titanate fiber and fine particles of second thermoplastic resins.

13. A single layer electrophotographic belt member having a volume resistance from $10^0 \Omega$ to $10^{14} \Omega$ consisting essentially of:

(a) from 30% by weight to 90% by weight of a thermoplastic resin;

(b) from 2% by weight to 30% by weight of a compound selected from the group consisting of a polyether-ester amide, a polyether ester and a polyether amide; and (c) from 2% by weight to 50% by weight of an insulating filler, wherein the compound acts as a sole conducting agent and a wall thickness of said electrophotographic belt member is from 50 μm to 300 μm, (i) a maximum value of volume resistance in a peripheral direction of the electrophotographic belt member is within 100 times a minimum value thereof, (ii) a maximum value of volume resistance in a generatrix direction of the electrophotographic belt member is within 100 times a minimum value thereof, (iii) a maximum value of surface resistance in a peripheral direction of the electrophotographic belt member is within 100 times a minimum value thereof, and (iv) a maximum value of surface resistance in a generatrix direction of the electrophotographic belt member is within 100 times a minimum value thereof; and wherein the volume resistance (A) of the belt member and the volume resistance (B) of the belt member from which the insulating filler is removed, satisfies the equation (B)/(A)<10 and the insulating filler is selected from the group consisting of zinc oxide, barium sulfate, calcium sulfate, barium titanate, potassium titanate, titanium oxide, magnesium oxide, magnesium hydroxide, aluminum hydroxide, talc, kaolin, hydrotalcite, silica, alumina, ferrite, calcium carbonate, hydrotalcite, nickel carbonate, alumina fiber, potassium titanate fiber and fine particles of second thermoplastic resins.

* * * * *

UNITED STATES PATENT AND TRADEMARK OFFICE

CERTIFICATE OF CORRECTION

PATENT NO. : 7,208,211 B2
APPLICATION NO. : 09/954252
DATED : April 24, 2007
INVENTOR(S) : Atsushi Tanaka et al.

It is certified that error appears in the above-identified patent and that said Letters Patent is hereby corrected as shown below:

COLUMN 5:

Line 46, "amide." should read --amide,--.

COLUMN 6:

Line 45, "theraioplastic" should read --thermoplastic--.

COLUMN 7:

Line 38, "Thus" should read --Thus,--.

COLUMN 10:

Line 51, "meter;" should read --meter:--; and
Line 60, "out" should read --cut--.

COLUMN 13:

Line 48, "140 mm," should read --140 mm.--.

COLUMN 14:

Line 21, "in" should read --In--;
Line 39, "Y2." should read --Y2,--;
Line 42, "X:" should read --K;--; and
Line 49, "FIG. 1." should read --FIG. 1,--.

COLUMN 18:

Line 39, "in the" should read --In the--.

COLUMN 22:

Line 4, "Example." should read --Example,--.

UNITED STATES PATENT AND TRADEMARK OFFICE

CERTIFICATE OF CORRECTION

PATENT NO. : 7,208,211 B2
APPLICATION NO. : 09/954252
DATED : April 24, 2007
INVENTOR(S) : Atsushi Tanaka et al.

It is certified that error appears in the above-identified patent and that said Letters Patent is hereby corrected as shown below:

COLUMN 25:

Table 2, under Comparative Example 6: “2.1” should read --2.7--.

Signed and Sealed this

Eighteenth Day of December, 2007

JON W. DUDAS

*Director of the United States Patent and Trademark Office*